United States Patent [19]

Victora et al.

[11] Patent Number: 5,715,225
[45] Date of Patent: Feb. 3, 1998

[54] MULTILAYER OPTICAL DATA STORAGE DEVICE

[75] Inventors: Randall Harry Victora, Rochester; Edward Charles Gage, Fairport, both of N.Y.

[73] Assignee: Eastman Kodak Company, Rochester, N.Y.

[21] Appl. No.: 714,672

[22] Filed: Sep. 16, 1996

[51] Int. Cl.⁶ .................................................. G11B 7/00
[52] U.S. Cl. .................. 369/94; 369/97; 369/58; 369/283
[58] Field of Search ........................... 369/94, 93, 47, 369/48, 58, 275.4, 275.2, 283

[56] References Cited

U.S. PATENT DOCUMENTS

| | | | |
|---|---|---|---|
| 5,251,198 | 10/1993 | Strickler et al. | 369/94 X |
| 5,408,453 | 4/1995 | Holtslag et al. | 369/275.4 X |
| 5,446,723 | 8/1995 | Best et al. | 369/94 X |
| 5,526,338 | 6/1996 | Hasman et al. | 369/94 X |

OTHER PUBLICATIONS

K.A. Rubin, et al., SPIE vol. 2338, p. 247, 1994.
"Plain Talk: Dual–Layer Compact Disc", 3M CD–ROM Services, St. Paul, Minn (1995).

Primary Examiner—Muhammad N. Edun
Attorney, Agent, or Firm—Raymond L. Owens

[57] ABSTRACT

A multilayer optical data storage device is disclosed which has at least two spaced apart storage layers, each of such layers being adapted to store information; a spacer layer positioned between alternating storage layers; and at least one of the layers including tracking and/or format information, and at least one storage layer that does not include substantial tracking and/or format information.

7 Claims, 5 Drawing Sheets

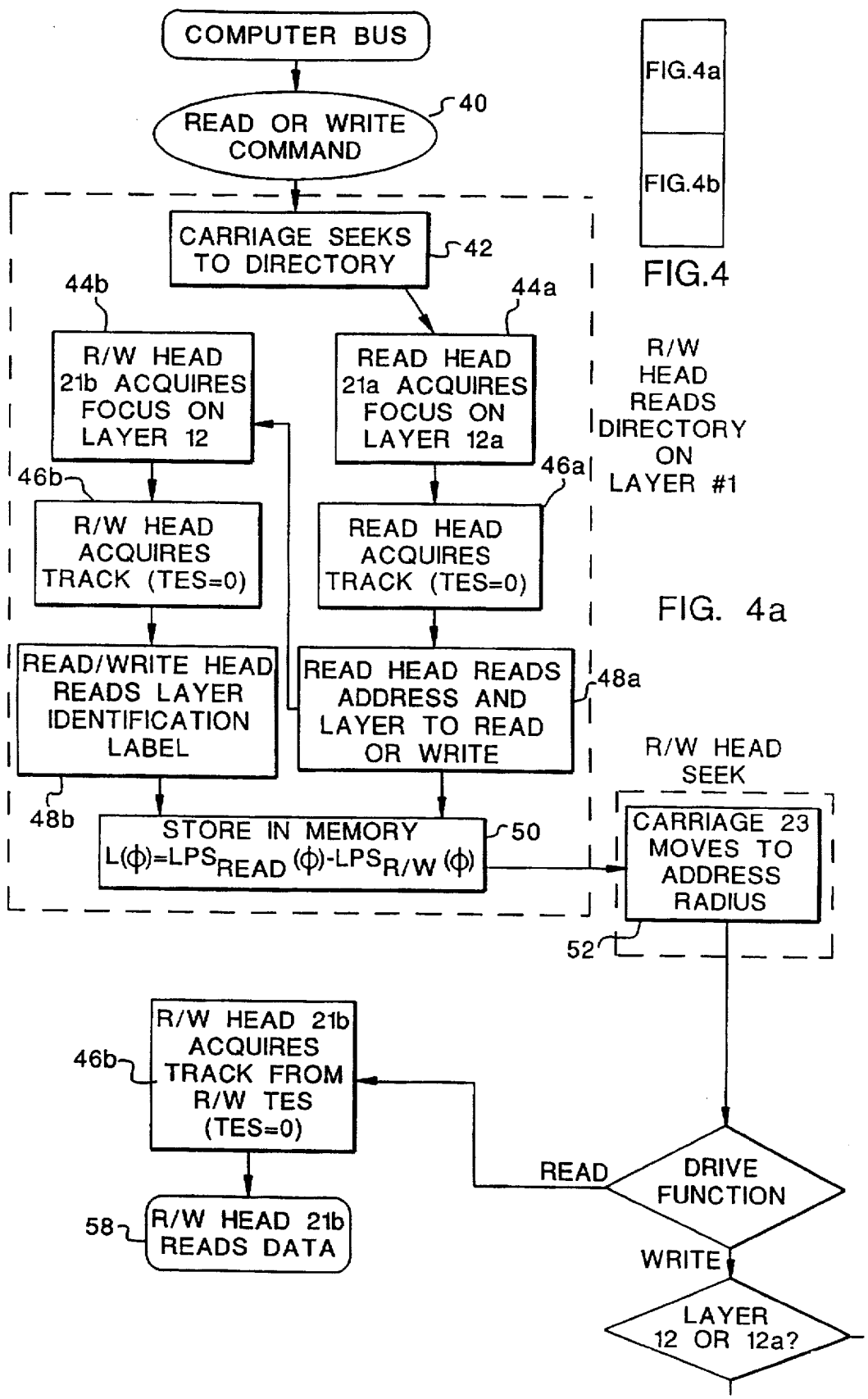

MULTILAYER OPTICAL DATA STORAGE DEVICE

CROSS REFERENCE TO RELATED APPLICATION

Reference is made to commonly assigned U.S. application Ser. No. 08/715,267 filed concurrently herewith, entitled "Writing Apparatus Using a Multilayer Optical Data Storage Device" by Edward C. Gage et al, and commonly assigned U.S. application Ser. No. 08/611,266 filed Mar. 5, 1996, entitled "Optical Storage Device Including Multiple Recording Layers" by Randall H. Victora et al, the teachings of which are incorporated herein by reference.

FIELD OF THE INVENTION

The present invention relates to optical data storage devices which have at least two spaced apart information recording layers.

BACKGROUND OF THE INVENTION

Multilayer optical recording devices are known and offer enhanced recording density. Essentially, these devices consist of two or more recording surfaces spaced sufficiently far apart that each surface can be read and recorded independently.

The provision of tracking and formatting information for each layer has received attention in the literature. See, for example, K. A. Rubin, H. I. Rosen, W. W. Wang, W. Imaino, and T. C. Strand in SPIE Vol. 2338, p. 247, 1994 who suggest the use of polycarbonate substrates with the grooves for tracking stamped into them. The two recording layers are separated at a fixed distance with the spacer layer consisting mostly of air. In this arrangement, there are two substrates and they form the exterior of this sandwich structure. Problems with this arrangement include the difficulty in aligning the substrates during manufacture, and the limitation of only two layers.

The Digital Video Disk employs unusually thin 0.6 mm polycarbonate substrates. One arrangement proposed for use in this system provides additional rigidity: instead of an air gap the two recording layers are glued together with an optically transparent adhesive.

An entirely different approach is described in "Plain Talk: Dual-Layer Compact Disc" 3M CD-ROM Services, St. Paul, Minn. (1995). This approach uses a polycarbonate substrate with grooves stamped into it for providing tracking information for one layer and an UV-curable photopolymer layer deposited atop the first recording layer and then stamped with the necessary information for the second layer. This process is relatively slow and suffers from difficulty in aligning the substrate with the stamper for the photopolymer layer.

SUMMARY OF THE INVENTION

It is an object of the present invention to provide either tracking or format information on at least one layer of a multilayer recording device in a cost-effective way.

This object is achieved in a multilayer optical data storage device, comprising:

(a) at least two spaced apart storage layers, each of such layers being adapted to store information;

(b) a spacer layer positioned between alternating storage layers;

(c) at least one of the layers including tracking and/or formatting information, while another layer does not include substantial tracking and/or formatting information; and (d) each layer containing information identifying that layer.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

Advantages of this invention are that disks made in accordance with the present invention will have a favorable capacity/cost ratio.

Optical storage devices in accordance with the present invention works with MO, WORM, and erasable phase change disks that are formatted planar or pregroove devices.

BRIEF DESCRIPTION OF THE DRAWINGS

FIGS. 4, 4A and 4B show a flow chart of the operation of the optical drive apparatus of FIG. 3.

DETAILED DESCRIPTION OF THE INVENTION

By use of the term "tracking information" is meant that information used for determining the location of the radial position on a device. For example, grooves or marks on a disk can be used to provide such information. By use of the term "format information" is meant information contained on the device, that is used by the optical drive apparatus such as for example, header information, sector information, and timing information that are usually provided by marks or a wobble in a tracking groove. Further format information may include disk identification and disk characteristics, such as optimum record power and optimum read power.

By use of the term "substantial tracking information" is meant information for determining the location of at least 20% of the tracks to be recorded on a particular layer. By use of the term "substantial format information" is meant at least 20% of the bytes of format information to be recorded on a particular layer.

Figure 1:
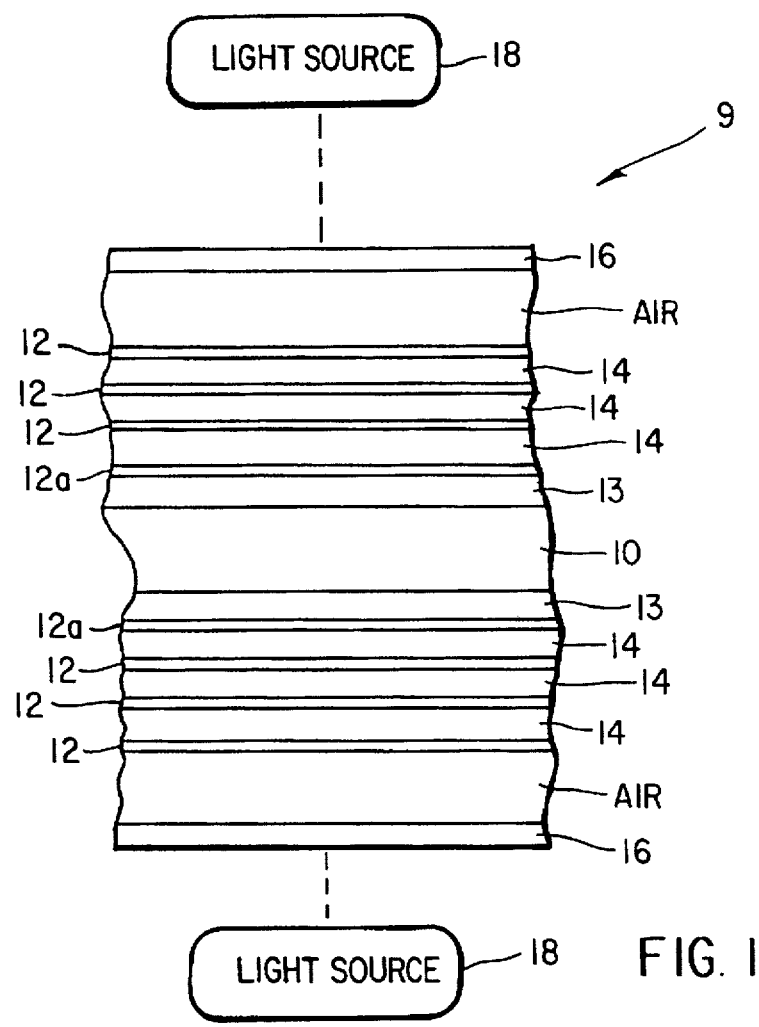
FIG. 1 shows a two-sided multilayer recording optical storage device in accordance with the present invention.

As shown in FIG. 1 there is provided a multilayer two-sided optical storage device 9 having a substrate 10 which can be made of any convenient material such as aluminum. The device 9 can be in the form of a disk. A recording layer 12 is formed over the substrate 10. Intermediate planarizing sublayers 13 can be formed between the recording layer 12 and the substrate 10. Typically, the recording layer can be made of phase change material, rare earth transition metal alloys, cobalt/platinum superlattices, or dyes. As shown, there are a plurality of spaced apart recording layers 12 each separated by its own spacer layer 14. The recording layer 12a will be understood to include tracking and format information while the other recording layers 12 do not as manufactured. Typically the spacer layer 14 can be air, a transparent organic material, or the like. A protective layer 16 is positioned over the top of the top recording layer 12. Each of the recording layers 12 may contain layers additional to an active layer, such as dielectric layers or reflective layers used for optical enhancement or protection. As will be described subsequently, an optical head is used to write and read data from the recording layers. The head, of course, is part an actuated device and includes a light source 18 which focuses light on the different layers 12 for recording. Since the optical storage device 9 is two-sided, the recording layers 12 on each side are independent although they can be used simultaneously.

Figure 2:
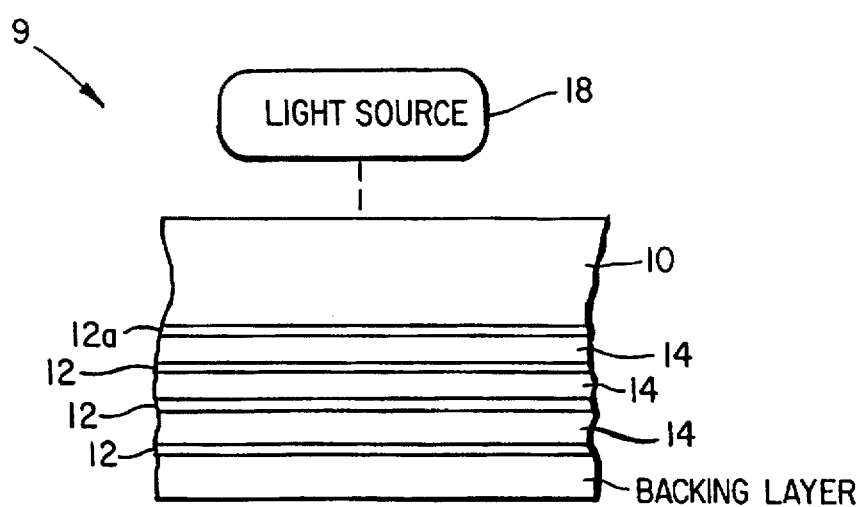
FIG. 2 shows a single-sided multilayer recording optical storage device in accordance with this invention.

Turning now to FIG. 2 where another, but single-sided, multilayer optical storage device 9 in accordance with the invention is shown. Where parts in FIG. 2 correspond to those in FIG. 1 the same numbers will be used. FIG. 2 is similar to FIG. 1 except that the substrate 10 is made of a transparent material such as glass or polycarbonate and that no protective layer 16 is used. The substrate 10 in this embodiment provides the same function as the protective layer 16. In the FIG. 1 arrangement light, of course, passes through the top protective layer 16 and illuminates the recording layers 12. In the FIG. 2 arrangement, light passes through the transparent substrate 10. Of course, a two-sided disk could be constructed by laminating two devices 9.

The recording layers 12 are mechanically separated by the spacer layer 14 that would be on the order of 10 to 100 µm thick. Thus only one recording layer 12 is in focus for a given beam. The format or tracking information can be mechanically contained in the substrate, grooved disk, or soft formatted using a servo writer. Typically, master layers employing mechanically recorded information such as grooves would be adjacent to the substrate 10, while the servo written master layer could be any recording layer 12. An important factor is that one of the recording layers will include tracking and/or format information (layer 12a) while another one does not. In both FIGS. 1 and 2 there is a series of these recording layers with spacer layers and it is a matter of design selection as to which recording layer will have tracking and/or format information.

A preferred embodiment of this invention is to limit the prerecorded information on the layers 12 (other than layer 12a). An important exception to this principal is layer identification that permit the optical drive apparatus to determine which layer is being accessed. According to the invention, there will be at least one layer identification label per layer in the disk as manufactured. This label might, for example, be a binary representation of a number or an arrangement of bits yielding a particular frequency when read from a rotating disk in form of a few tracks. A possible implementation of this invention is to replicate this layer identification label in subsequent format information written on layers 12 by the optical drive apparatus.

Figure 3:
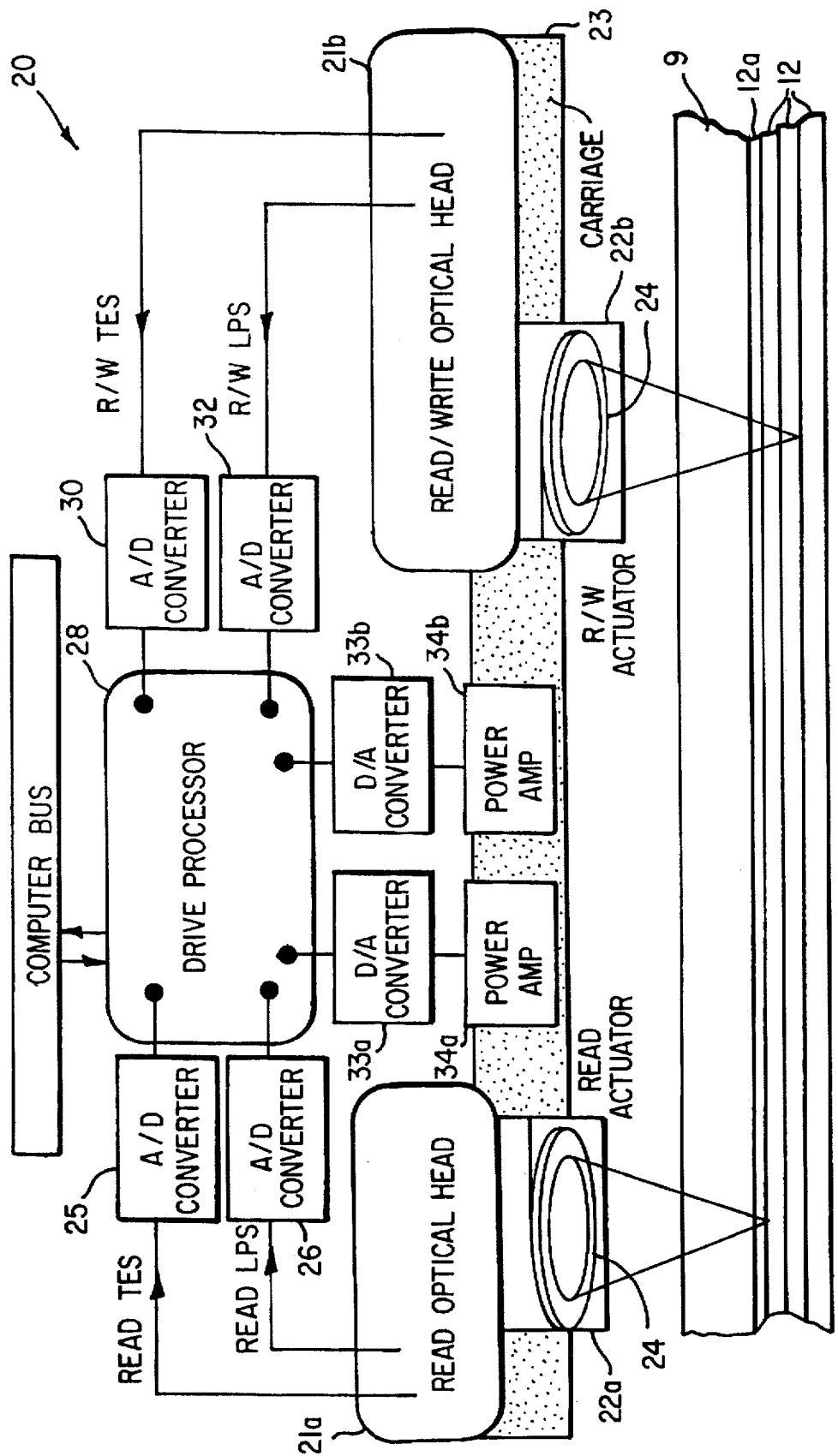
FIG. 3 shows in schematic form more details of a representative of an optical drive apparatus for using the devices of FIGS. 1 and 2.

Turning now to FIG. 3, where an optical drive apparatus 20 in accordance with the present invention is shown. The apparatus 20 includes two separate optical heads 21a and 21b which respectively include their own actuators. Each actuator 22a and 22b is conventional in construction and includes an objective lens 24. By using two separate actuators 22a and 22b mechanically and electronically linked, tracking and sector information are obtained from the appropriate recording layer of the optical storage device which was preformed or formatted.

In FIG. 3, the two optical heads 21a and 21b are mounted on a radial access carriage 23 positioned over the optical recording device 9 shown in FIGS. 1 or 2. The carriage 23 translates in a radial direction both the optical heads 21a and 21b relative to the top surface of the optical recording device 9. Optical head 21a is conventional and has both tracking and focusing capabilities. Optical head 21a provides conventional tracking error (TES) and position sensing signals (LPS). The tracking error signal provided by optical head 21a is provided to an analog to digital converter 25 which digitizes the tracking error signal and provides a digital input signal to drive processing circuit 28. In a similar fashion the optical head 21a produces a lens position signal (LPS) which is digitized by an analog to digital converter 26 and this digital signal is applied to the drive processor circuit 28. The optical head 21a is a low cost read head that has focus and tracking sensors. The optical head 21b can also be conventional and provides tracking error (TES) and lens position signals (LPS) which are respectively digitized by A/D converter 30 and 32 respectively. These digital signals are also applied to the drive processor circuit 28.

For purposes of illustration we assume that a single-sided optical storage device 9 (See FIG. 2) includes four write-once recording layers where the layer 12a nearest the substrate is preformatted with tracking information and sector header information (format information). The drive processor 28 outputs signals to control the tracking actuator of the read and read/write head 21a and 21b through D/A converters 33a and 33b and power amplifiers 34a and 34b respectively.

Table 1 shows the role of the two optical heads 21a and 21b when reading and writing data from the various layers of the FIG. 2 device 9. Optical head 21a is continuously focused on the recording layer that contains tracking and format information. Initially the device 9 will only have substantial tracking information on one recording layer 12 which is labeled 12a. While this recording layer 12a is being read or written on, a tracking look-up table may be constructed by the drive processor circuit 28 using the tracking signals and lens positions from both of the optical heads 21a and 21b. The actuator drive signal produced by the drive processor circuit 28 are used to control the position of the actuators 22a and 22b. When writing any other layer, the tracking actuator drive current for 22b will be derived from the tracking error signal and lens position from optical head 21a and the tracking look-up table previously constructed. When reading from a recording layer 12a, optical heads 21a and 21b will produce tracking error signals and lens position signals that are used by the microprocessor 24 for changing the tracking look-up table. The look-up table thus constructed is stored in memory included in the drive processor circuit 28.

TABLE 1

Example for Four Layer Media with two actuators

| Function | Layer | Optical Head 21b | Optical Head 21a | Tracking Actuation Signal | Tracking Look-up Table Status |
|---|---|---|---|---|---|
| Read  | 12a | F,T,R @L12a   | F,T,R @L12a | #2lb @L12a | Updating |
| Write | 12a | F,T,R,W @L12a | F,T,R @L12a | #2lb @L12a | Updating |
| Read  | 12  | F,T,R @L12    | F,T,R @L12a | #2lb @L12  | Updating |
| Write | 12  | F,R,W @L12    | F,T,R @L12a | #21a @L12a + Table | Locked in Use |

F = focus, T = tracking, R = read, W = write, L = recording layer

The first and second columns of Table 1, respectively, indicate the commanded read/write function on any of the layers. Column 3 shows the functions being performed by the read/write optical head 21b, on the appropriate layer (@L) and column 4 shows the function of the optical head 21a focused on layer 12a. The tracking actuator signal (TES) source for the read/write head is shown in column 5. During read, the optical heads 21a and 21b always use their own TES signal for the tracking error servo, but during writing of a non-formatted layer, the read/write optical head 21b uses the information from optical head 21a tracking on layer 12a plus the tracking look-up table. The status of the tracking look-up table is shown in column 6.

The tracking look-up table may contain more than a simple offset of lens position signals (LPS). It may contain offset and gain as a function of disk rotation angle, layer number, radius, and frequency. It may also contain information about the differences in the two actuators, angular offset, gain, frequency response, etc. The information in the tracking look-up table may be calculated from the lens position signal and tracking error signal from the two heads. When a device 9 is inserted, the apparatus may recall the table from memory, go to reading the master layer to obtain disk information and build the tracking look-up table, or it may wait for a request to write to a recording layer. When writing to recording layers 12 other than the recording layer 12a, sector headers and tracking information can also be written.

Figure 4B:
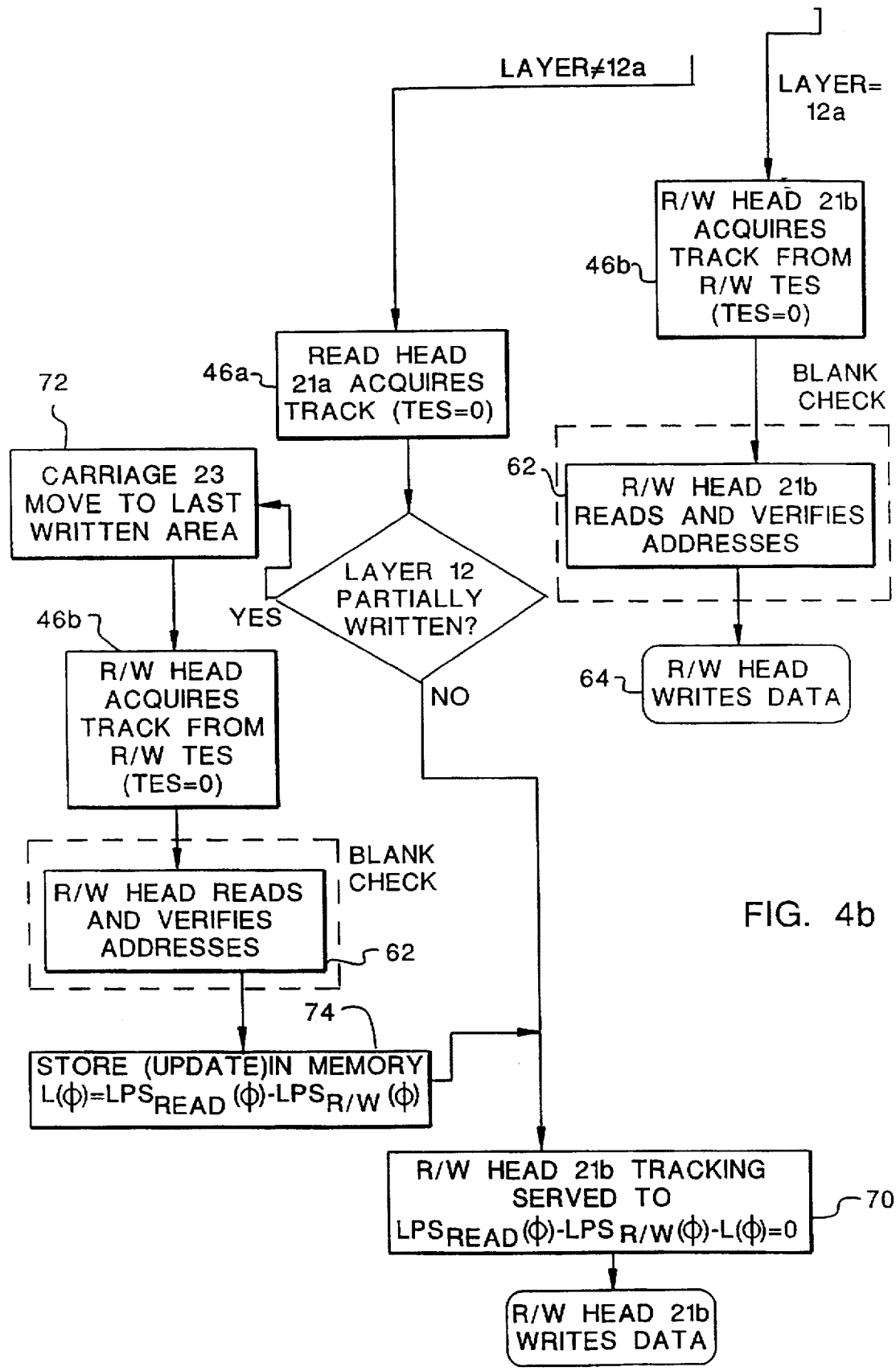

Turning now to FIG. 4, which is a flow chart of a method of operation of the optical drive apparatus 20. For purposes of illustration, we will discuss one application of the invention with write-once media. After a read or write command 40 is received the optical drive apparatus 20 responds as follows: the carriage 23 seeks to the disk directory 42 on the device 9. The read head 21a acquires focus on layer 12a. This is shown in block 44a. Next, the read head 21a acquires track (See block 46a). As this process proceeds, the read head 21a reads the directory information and stores in memory the desired recording layer and the memory address to be used for the read or write command (See block 48a).

The read/write head 21b acquires focus on the layer 12 (See block 44b), at the same time the read/write head also acquires track (See block 46b). The read/write head 21b reads the layer identification labels (See block 48b) to verify layer identity. In block 50, during the read process the lens position signals from the read and read/write optical heads LPS signals are differenced and stored in memory to construct the tracking look-up table as shown by the equation in block 50. The carriage 23 is now moved so that the read/write head 21b is positioned at the correct location to access the desired address radius on a desired recording layer 12 (See block 52). At this point the drive processing circuit makes a decision. If reading is to be accomplished then the read/write head 21b, using its tracking error signal, acquires track as shown in block 46b. The reading process then continues in conventional fashion as depicted in block 58.

If the apparatus 20 has to write then the appropriate recording layer 12 is found. If that layer is layer 12a, the read/write head acquires track (See block 46b) from its tracking error signal. A verification process is now accomplished where the read/write head determines that there are blank areas to be written (See block 62). If the verification is positive then the read/write head will write data (See block 64). If a layer other than 12a is to be written to then the read head acquires track in a convention manner (See block 46a). If the layer 12 is blank then the read/write head moves directly to block 70 and acquires tracking information from the lens position signal from each optical head 21a and 21b respectively and a previously constructed look-up table. During write the LPS from each head are differenced and the look-up table is subtracted. This quantity is servoed to a zero value and $LPS_{read}(\phi)-LPS_{read/write}(\phi)-L(\phi)=0$, so that the actuators have the same lens offsets at each angle as they did at the last look-up table construction. The variable $\phi$ means angular position of the optical storage device. This arrangement will be described in more detail in reference to FIG. 5. However if the layer 12 has been partially written, then the following sequence takes place: Carriage 23 will be moved to the last written position as shown by block 72. Then the read/write head acquires track as shown in block 46b. Finally, a blank check 62 is run as previously described. In block 74 during the blank check, the tracking look-up table will be updated to contain the lens position signal difference from the read head and read/write head as the last previously written position of the optical device 9 is read.

Figure 5:
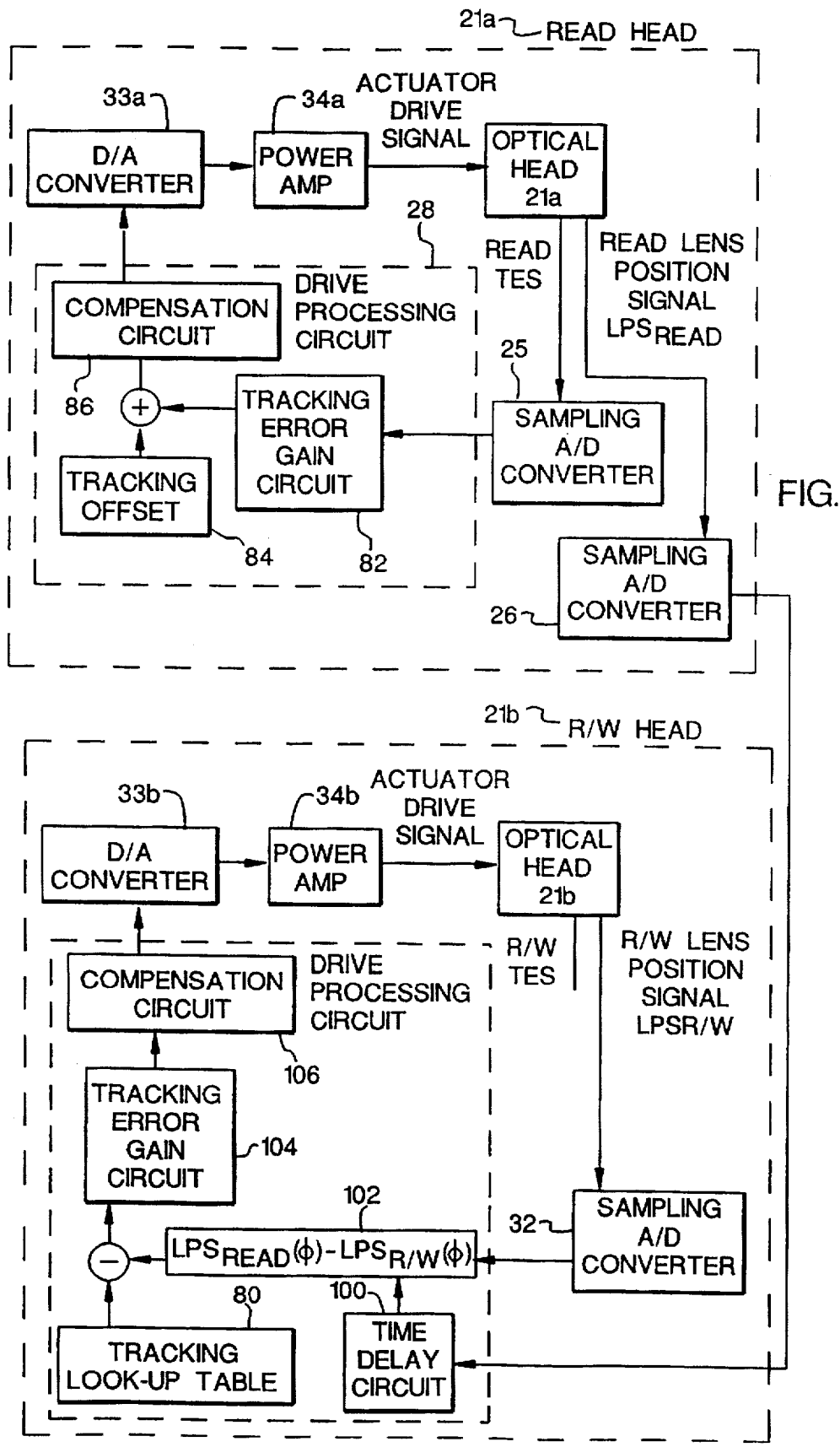
FIG. 5 is an expanded diagram of block 70 shown in FIG. 4.

Turning now to FIG. 5 wherein an expanded diagram of block 70 will be described. The look-up tables constructed as in blocks 74 or 50 will be understood to be included in tracking look-up table 80. The construction of FIG. 5 shows the servo control of the read optical head 21a and the servo control of the read/write optical head 21b. The read optical head tracking error servo will first be described. The optical head 21a, as is conventional, produces TES and lens LPS. These signals are provided to analog digital converters 25 and 26 respectively as shown in FIG. 3. The sampled TES signal is used by the drive processing circuit 28 to produce an actuator drive signal by using predetermined tracking error gain circuit 82, tracking offset 84, and compensation circuit 86. As is quite conventional, D/A converter 33a provides an input to a power amplifier 34a which produces the actuator drive signal for the optical head 21a. The analog to digital converter 26 provides a sampled digitized lens position signal to a timed-delay circuit 100. The timed-delay circuit provides input to a subtractor 102 within the processing circuit which subtracts from the lens position the lens position signal from the optical head 21b. The time delay process synchronizes the LPS as a function of φ since the optical heads may have different angular offsets depending on their carriage mounting. The optical head 21b drives the A/D converter 32 as has previously been described. The previously construction look-up table 80 is then subtracted from the differenced lens position signals and an input is provided into a tracking error gain circuit 104. Next this signal is provided to a compensation circuit 106 which drives a D/A converter 33b which drives the power amplifier 34b as previously described. Thus, the tracking motion of the read/write head's actuator is servo controlled to maintain the LPS difference stored in the tracking look-up table (80) and quality writing is maintained; i.e. constant track pitch.

The invention has been described in detail with particular reference to certain preferred embodiments thereof, but it will be understood that variations and modifications can be effected within the spirit and scope of the invention. For example, the description of FIG. 4 describes one example of a sequence particularly appropriate to WORM media, but the present invention will be understood to be usable with other types of media. Also, the technique, described in this application, of copying tracking and format information from one layer to another could be done without writing user data, possible as part of the finishing operation at the factory.

PARTS LIST

9—multilayer optical storage device
10—substrate
12—recording layer
12a—recording layer
13—intermediate planarizing sublayers
14—spacer layer
16—protective layer
18—light source
20—optical drive apparatus
21a—optical head
21b—optical head
22a—actuator
22b—actuator
23—radial access carriage
24—objective lens
25—A/D converter
26—A/D converter
28—drive processing circuit
30—A/D converter
32—A/D converter
33a—D/A converter
33b—D/A converter
34a—power amplifiers
34b—power amplifiers
40—read or write command
42—carriage seeks to disk directory
44a—acquire focus
44b—acquire focus
46a—acquire track
46b—acquire track
48a—read
48b—read
50—construct tracking look-up table
52—move carriage
58—read data
62—blank check
64—write data
70—read/write head servoed
72—move carriage
74—construct look-up table
80—look-up table
82—tracking error gain circuit
84—tracking offset
86—compensation circuit
100—time delay circuit
102—subtractor
104—tracking error gain circuit
106—compensation circuit

We claim:

1. A multilayer optical data storage device, comprising:

(a) at least two spaced apart storage layers, each of such layers being adapted to store information;

(b) a spacer layer positioned between alternating storage layers;

(c) at least one of the layers including tracking information, and at least one storage layer that does not include substantial tracking information; and (d) each layer containing information identifying that layer.

2. The optical storage device of claim 1 where one of the layers is a recording layer which has preformed information.

3. The optical storage device of claim 1 where at least one of the layers is a recording layer which records information by means of a focused light beam.

4. The storage device of claim 1 where at least one of the layers that does not include substantial tracking information contains some tracking information.

5. A multilayer optical data storage device, comprising:

(a) at least two spaced apart storage layers, each of such layers being adapted to store information;

(b) a spacer layer positioned between alternating storage layers;

(c) at least one of the layers including format information, and at least one storage layer that does not include substantial format information; and (d) each layer containing information identifying that layer.

6. The optical storage device of claim 5 where one of the layers is a recording layer which has preformed information.

7. The optical storage device of claim 5 where at least one of the layers is a recording layer which records information by means of a focused light beam.

* * * * *